US009683534B2

(12) United States Patent
Deng

(10) Patent No.: US 9,683,534 B2
(45) Date of Patent: Jun. 20, 2017

(54) STARTER AND ENGAGING DEVICE THEREOF

(71) Applicant: Bosch Automotive Products (Changsha) Co., Ltd., Changsha Hunan (CN)

(72) Inventor: Fangmin Deng, Changsha Hunan (CN)

(73) Assignee: Bosch Automotive Products (Changsha) Co., Ltd., Changsha Hunan (CN)

( * ) Notice: Subject to any disclaimer, the term of this patent is extended or adjusted under 35 U.S.C. 154(b) by 253 days.

(21) Appl. No.: 14/526,715

(22) Filed: Oct. 29, 2014

(65) Prior Publication Data

US 2015/0114177 A1    Apr. 30, 2015

(30) Foreign Application Priority Data

Oct. 31, 2013  (CN) .......................... 2013 1 0527582

(51) Int. Cl.
| | |
|---|---|
| *F02N 15/06* | (2006.01) |
| *F02N 15/02* | (2006.01) |
| *F16H 55/08* | (2006.01) |
| *F16H 1/28* | (2006.01) |
| *F02N 15/04* | (2006.01) |

(52) U.S. Cl.
CPC .......... *F02N 15/06* (2013.01); *F02N 15/062* (2013.01); *F02N 15/065* (2013.01); *F16H 1/28* (2013.01); *F16H 55/0873* (2013.01); *F02N 15/023* (2013.01); *F02N 15/046* (2013.01); *F02N 15/063* (2013.01); *F02N 15/067* (2013.01); *F02N 2015/061* (2013.01); *Y10T 74/131* (2015.01); *Y10T 74/134* (2015.01)

(58) Field of Classification Search
CPC ............................ F16H 55/0873; F02N 15/04
See application file for complete search history.

(56) References Cited

U.S. PATENT DOCUMENTS

| | | | | | |
|---|---|---|---|---|---|
| 4,902,905 | A | * | 2/1990 | Morishita | ............. F02N 15/023 290/48 |
| 5,684,334 | A | * | 11/1997 | Zenmei | ................... F02N 15/06 290/38 R |
| 2015/0369201 | A1 | * | 12/2015 | Neet | ..................... F02N 15/063 74/6 |

* cited by examiner

*Primary Examiner* — Terence Boes
(74) *Attorney, Agent, or Firm* — Michael Best & Friedrich LLP

(57) ABSTRACT

An engaging device and a starter comprising the engaging device, the starter comprises an electric motor, a speed reducer connected with the electric motor, an overrunning clutch comprising a driving piece connected with the speed reducer and a driven piece, and an engaging device with a main shaft connected with the driven piece of the overrunning clutch. A quick engagement may be achieved and a certain initial engagement depth is guaranteed. During the engaging process, the pinion may mesh into a ring gear in its own initiative, reducing the effect of teeth milling phenomenon on the ring gear to a maximum extent.

19 Claims, 5 Drawing Sheets

(a)  (b)

STARTER AND ENGAGING DEVICE THEREOF

BACKGROUND OF THE INVENTION

The present invention relates to vehicle parts, and particularly to an engaging device for a starter and a starter including the engaging device.

A starter is also referred to as a motor, in which power is generated by a DC motor and then is transmitted to a flywheel gear via a starter gear. A flywheel is driven, rotating a crankshaft to start an engine.

After the starter is activated, a pinion is moved axially along a main shaft. The teeth of the pinion are elastically pressed against the teeth of a ring gear. Then, the pinion is rotated along with the main shaft, such that the teeth of the pinion slide into tooth spaces of the ring gear, and thus engaging of the pinion and the ring gear is achieved.

In most cases, the pinion of the starter may not engage with the ring gear directly. The engaging motion will not begin until the pinion is driven by the electric motor to turn a certain angle. The engaging process of the pinion requires some time and the engagement depth increases with time. Since there is a very high torque when the electric motor just starts to rotate (when the speed is low), generally, at the time when the pinion is driven by the electric motor to turn a certain angle to find the tooth space of the gear ring, the pinion still cannot engage with the ring gear completely, to put it more precisely, the engagement depth in the ring gear (initial engagement depth) is very small (typically 0.5-1.5 mm). Under high torque, there is a possibility that the ring gear will be scratched by the pinion if the engagement depth of the pinion is too small (typically, the strength of the material of the pinion is much higher than that of the ring gear, and so is the rigidity). This phenomenon is similar to the process of machining a part with a milling cutter and thus is commonly known as "teeth milling". Therefore, the initial engagement depth of the pinion with the ring gear is an important factor to judge the engagement performance of a starter.

Currently, there are a few solutions to improve the engagement performance. One of them is to produce a tip chamfer for the pinion and a flank chamfer for the ring gear at the opposing end surfaces of the pinion and the ring gear, to facilitate guiding the teeth of the pinion to slide along the teeth of the ring gear. However, a large relative rotating angle is still needed for the pinion to engage with the ring gear, and the need to rely on motor drive to implement the process of finding tooth spaces cannot be avoided completely. Another solution is, by using a two-stage circuit, to allow an enhanced first stage circuit to drive the pinion to fulfill the process of finding tooth spaces and engaging, a second stage current to actually drive an engine is not switched on until the engagement depth of the pinion reaches a relatively high value (over 5 mm), thereby reducing teeth milling phenomenon during the engaging process caused by driving a pinion under high torque. However, another circuit design is needed to achieve this function and thus increases the cost of the product. Further, such a circuit is prone to failure in poor working conditions, causing dissatisfaction from a user.

SUMMARY OF THE INVENTION

The technical problem to be solved by the present invention is to provide an engaging device for a starter, which enables the pinion of the starter to engage with the flywheel ring gear of an engine quickly and reliably.

The engaging device according to one aspect of the present invention comprises a main shaft and a pinion sleeved on the main shaft, an external spline is provided on the main shaft and the main shaft defines a limit position of the pinion, the external spline has teeth comprising a first active tooth flank; an internal spline mating with the external spline of the main shaft is provided inside the pinion, the internal spline has teeth comprising a first passive tooth flank; the acting force applied on the pinion by the first active tooth flank of the external spline when the first active tooth flank of the external spline is in contact with the first passive tooth flank of the internal spline has a circumferential component and an axial component toward the limit position; the teeth of the internal spline comprise a second active tooth flank and the teeth of the external spline comprise a second passive tooth flank, the acting force applied on the pinion by the second passive tooth flank of the external spline when the second active tooth flank of the internal spline is in contact with the second passive tooth flank of the external spline has no axial component away from the limit position.

Optionally, in the engaging device described above, the external spline of the main shaft and the internal spline of the pinion forms a clearance fit therebetween, an elastically pre-deformed elastic element is mounted between the main shaft and the pinion, the pre-deformed elastic element applies an elastic force in a direction toward the limit position to the pinion.

Optionally, in the engaging device described above, the first active tooth flank extends in a helical form in a first direction; the second active tooth flank extends axially and/or in a helical form in a second direction, the helical in the second direction is opposite to the helical in the first direction.

Optionally, in the engaging device described above, the external spline of the main shaft comprises a first external spline and a second spline, the first active tooth flank is provided on the first external spline, the first external spline is a helical spline, the second external spline is a straight spline; the internal spline of the pinion comprises a first internal spline, the first internal spline is a helical spline, the second active tooth flank is provided on the teeth of the first internal spline located corresponding to the second external spline.

Optionally, in the engaging device described above, the second active tooth flank is a chamfer on the first internal spline, the surface where the chamfer lies is parallel to the surface of the tooth flank of the second external spline.

Optionally, in the engaging device described above, the first external spline and the second external spline are made integrally or arranged separately.

Optionally, in the engaging device described above, a clearance exists between the second external spline and the first internal spline when the first active tooth flank contacts the tooth flank of the first internal spline; a clearance exists between the first internal spline and the first external spline when the second active tooth flank contacts the second external spline.

Optionally, in the engaging device described above, the main shaft comprises a snap ring mounted thereon, which snap ring abuts the pinion to define the limit position of the pinion.

Optionally, in the engaging device described above, the snap ring is mounted on the external spline of the main shaft.

The pinion is able to find clearance of tooth spaces of the ring gear immediately and fulfill engaging due to the fact that the pinion may turn a certain angle relative to the main shaft by itself while making an axial movement therebetween. The pinion is capable of engaging with the ring gear rapidly all the time, but not only in the circumstance that the main shaft is rotating, even it is not rotating. At least one of the main shaft and the pinion is provided with combined splines, respectively a helical spline and a straight spline, wherein the helical spline and the straight spline may be arranged and manufactured separately.

The starter according to a second aspect of the present invention comprises an electric motor, a speed reducer connected with the electric motor, an overrunning clutch comprising a driving piece connected with the speed reducer and a driven piece, and the above described engaging device, the main shaft of the engaging device is connected with the driven piece of the overrunning clutch.

The starter of the present invention is capable of quickly engaging and ensures a certain initial engagement depth. During the engagement, the pinion may engage with a ring gear in its own initiative, reducing the effect of teeth milling phenomenon on the ring gear to a maximum extent. Compared with the prior art, the present starter only adds combined splines, which can easily made in construction and manufacture.

BRIEF DESCRIPTION OF THE DRAWINGS

Other aspects and characters of the present invention will become apparent from the following description in detail with reference to accompanying drawings. However, as will be understood, the figures are designed only for illustration, and should not be construed as limitation of the scope of the present invention, for which reference should be made to the appended claims. It should also be noted that the figures are merely intended to conceptually illustrate the structures and processes described herein and are not necessarily drawn to scale, unless indicated otherwise.

The present invention will be understood more fully with reference to the detailed description of the specific embodiments below in conjunction with the drawings. Similar or identical elements are indicated by the same reference signs throughout the drawings, in which:

FIG. 3b is a partial sectional view of the assembled pinion and main shaft in FIG. 3a;

DETAILED DESCRIPTION

Figure 1:
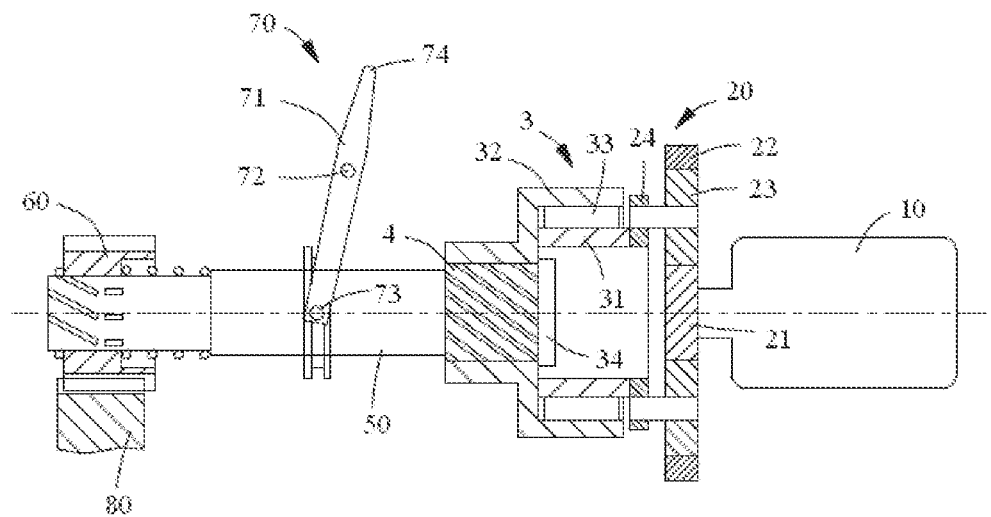
FIG. 1 is a structural schematic view of a specific embodiment of a starter of the present invention.

Hereinafter, specific embodiments of the present invention will be described in detail with reference to the drawings, in order to help persons skilled in the art to understand exactly the subject claimed in the present invention.

Spatial relationship expressions, such as "front side", "front end", "rear end", "left", "right", "downward" and the like, will be used herein for convenience to describe the relationship of one element or feature and another element or feature shown in the drawings. As will be appreciated, in addition to the orientations described in the drawings, those spatial relationship expressions are intended to encompass different directions and orientations of the device in use or in operation.

Referring to FIG. 1, a structural schematic view of a specific embodiment of a starter of the present invention is shown. The starter includes an electric motor, a drive mechanism and a control portion. The electric motor is a DC electric motor 10, which functions to transfer DC electric power input by a battery into mechanical energy, generating electromagnetic torque. The drive mechanism is responsible for transmitting the electromagnetic torque and motivating the electric motor to engage with a ring gear 80 on an engine.

The drive mechanism includes a speed reducer, an overrunning clutch and an engaging device. Here, the engaging device refers to the part in the starter engaging with the ring gear 80 of the engine, which includes a main shaft 50 and a pinion 60. The speed reducer may be a speed reducer of any kind known by persons skilled in the art, for example, a gear speed reducer. As shown in FIG. 1, the speed reducer is a planet gear speed reducer 20. In particular, the planet gear speed reducer 20 includes a sun gear 21, and an outer ring gear 22 that is mounted concentrically with the sun gear 21, a planet gear 23 and a planet carrier 24. The outer ring gear 22 may rotate about the sun gear 21, with the planet gear 23 located between the sun gear 21 and the outer ring gear 22 and engaging with the sun gear 21 and the outer ring gear 22, respectively. Meanwhile, an output shaft of the planet gear 23 is connected to the planet carrier 24. An output shaft of the electric motor is connected to the sun gear 21. When the electric motor rotates and drives the sun gear 21, the output movement of the planet carrier 24 is a rotary movement with reduced speed.

The overrunning clutch 3 includes a driving piece 31 and a driven piece 32. The driving piece 31 is disposed inside the overrunning clutch 3 and is connected with the planet carrier 24. The driven piece 32 is disposed outside the overrunning clutch 3. In particular, the driven piece 32 has one end sleeved outside the drive piece 31 and another end connected with the main shaft 50. A roller 33 is arranged between the driving piece 31 and the driven piece 32, and through the roller 33, the output torque in the planet carrier 24 is transmitted from the driving piece 31 to the main shaft 50 via the driven piece 32. The construction of the overrunning clutch 3 is not limited to the above described form, and the roller 33 may be other transmitting element known by persons skilled in the art.

The overrunning clutch 3 is connected to one end of the main shaft 50 through a spline means 4. The pinion 60 is installed on the other end of the main shaft 50. The spline means 4 includes an interior spline provided on the inside of the driven piece 32 of the overrunning clutch 3 and an exterior spline provided on the main shaft 50. The interior spline and the exterior spline mate with each other. That is, the respective teeth of the interior and exterior splines fit into tooth spaces of the counterpart. The tooth profile of the spline can adopt any form known by persons skilled in the art, for example, a rectangular tooth or a involute tooth. The interior and exterior spline may be a straight spline with its teeth extending straightly along an axis of the main shaft 50 or a helical spline with its teeth extending helically. FIG. 1 shows an example of a helical spline.

When the overrunning clutch 3 is engaged, the driven piece 32 rotates and drives the main shaft 50. Between the interior spline and the exterior spline, a rotary movement is performed. Meanwhile, due to the effect of the helical spline, the exterior spline (i.e., the main shaft 50) is moved in an axial direction relative to the interior spline (i.e., the driven piece 32). As shown in FIG. 1, the axial movement of the main shaft 50 is further controlled by a control device 70. A front end 73 of a shift lever 71 of the control device 70 is fixed on the main shaft 50, a middle portion of the shift lever 71 is disposed on a pivot and is rotatable about the pivot, and a rear end 74 of the shift lever 71 is connected with an actuating mechanism (not shown) of the control device 70. When the actuating mechanism pulls the rear end 74 of the shift lever 71, the front end 73 of the shift lever 71 enables the exterior spline of the main shaft 50 to move relative to the interior spline of the driven piece 32 of the overrunning clutch 3. In addition, an axial limiting means is further provided for the main shaft 50. A stopper 34 is arranged in the overrunning clutch 3 at an end surface of the interior spline of the driven piece 32. The main shaft 50 is prevented from moving further away from the driven piece 32 in the axial direction when the interior spline comes into contact with the stopper 34.

When the electric motor is started, the torque is in turn transmitted through the speed reducer, the overrunning clutch 3, the spline means 4, the main shaft 50 to the pinion 60. Then, the pinion 60 is rotated.

Figure 2:
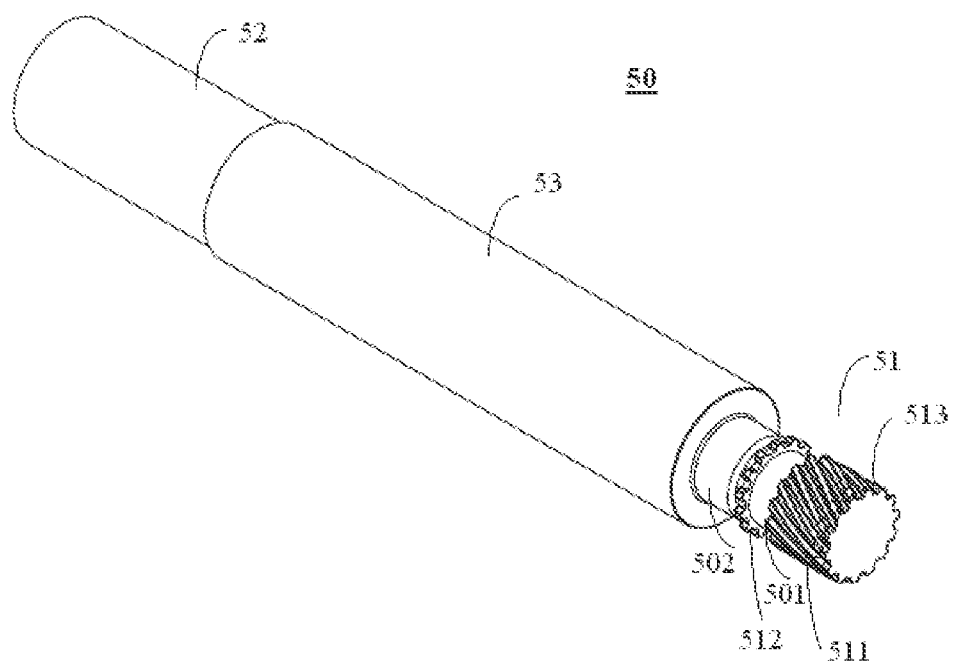
FIG. 2 is a perspective view of a specific embodiment of the main shaft in the starter of the present invention.

Referring to FIG. 2, a structural schematic view of the main shaft 50 of the engaging device of the present invention is shown. The main shaft 50 is a stepped shaft, which includes a middle section 53, and a first section 51 and a second section 52 arranged on both ends of the middle section 53. The middle section 53 is used for connection with the shift lever 71. The first section 51 has a diameter smaller than that of the middle section 53. The first section 51 includes thereon a spline portion 501 where a spline is provided and a smooth spring mounting portion 502 where no spline is provided. A spring 516 is sleeved on the spring mounting portion 502, how the spring 516 is arranged will be described below. A first external spline 511 is provided on the spline portion 501. The first external spline 511 is a helical spline and begins at one end (a front side, as shown in FIG. 2) of the spline portion 501. A second external spline 512 is further provided on the spline portion 501. The second external spline 512 is a straight spline and terminates at the other end of the spline portion 501, as shown in the Figure. The first external spline 511 and the second external spline 512 have the same tooth profile, which may be a rectangular tooth profile or a involute tooth profile. In the present embodiment, an external spline with an easily manufactured rectangular tooth profile is preferable. The teeth of the first external spline 511 extends spirally on the spline portion 501 toward the middle section 53, and the teeth of the second external spline 512 extend axially and straightly along an axis of the main shaft 50 toward the middle section 53. The first external spline 511 and the second external spline 512 may separate, or may be made integrally. In the present embodiment, it is preferable that the first external spline 511 and the second external spline 512 are arranged separately with a certain space therebetween, technically, which can be done more easily, and the first external spline 511 has a length much larger than that of the second external spline 512.

It should be understood, it is also possible that the first external spline 511 is a straight spine and the second external spline 512 is a helical spline, so as to constitute the combined splines on the spline portion 501.

The second section 52 (its external spline is not shown) of the main shaft 50 mates with the internal spline of the driven piece 32 of the overrunning clutch 3.

Figure 3A:
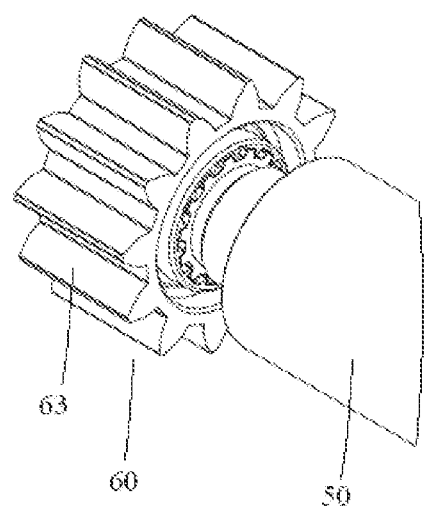
FIG. 3a is a partial perspective view with the pinion and the main shaft in the starter of the present invention being assembled.
Figure 3B:
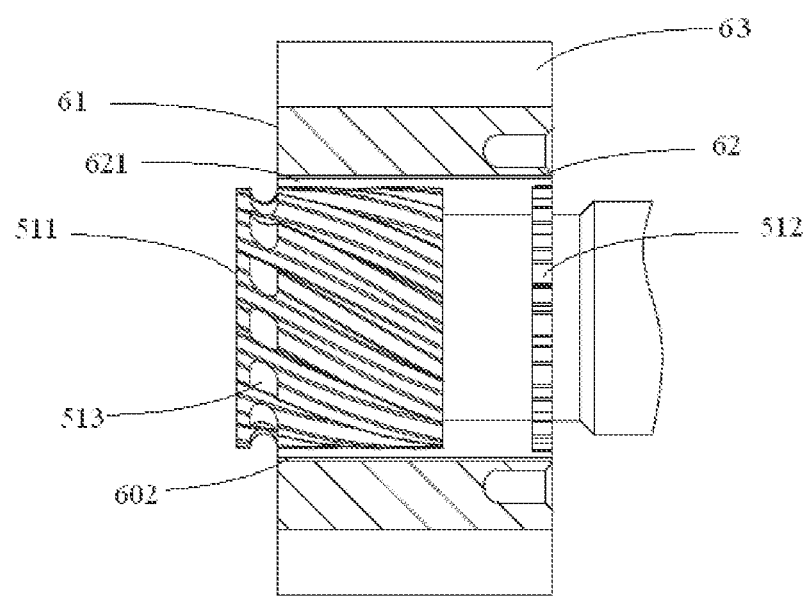
Figure 4:
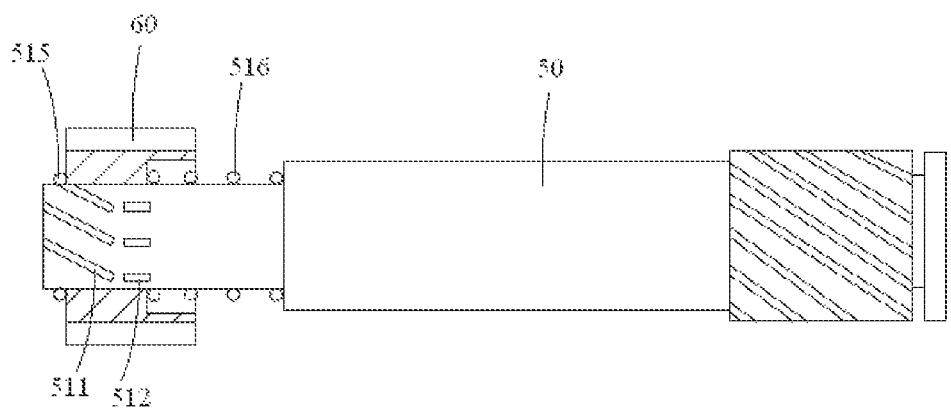
FIG. 4 is another partial sectional view with the pinion and the main shaft in the starter of the present invention being assembled.

Referring to FIGS. 3-4, a structural schematic view of the engaging device of the present invention including the pinion 60 is shown. The pinion 60 includes a pinion body 61, on which an inner hole 62 is provided and exterior teeth 63 for engaging with the flywheel ring gear 80 of the engine are circumferentially disposed. The inner hole 62 is a step hole and includes at least a spline portion 602 for providing a spline. A first internal spline 621 is provided on the spline portion 602. The first internal spline 621 is the spline that mates with the helical external spline on the spline portion 501 of the first section 51 of the main shaft 50. That is, parameters, such as the profile, the number and the helical angle, etc., of the teeth of the first internal spline 621 coincide with those of the helical external spline of the first section 51 of the main shaft 50, such that the respective teeth of the internal and external splines may be inserted into the tooth spaces of the counterpart. When the first external spline 511 or the second external spline 512 of the first section 51 of the main shaft 50 has its tooth profile in rectangular shape, the tooth profile of the first internal spline 621 of the pinion 60 will also be rectangular.

The spaces of the first internal spline 621 of the pinion 60 and the teeth of the external spline (which includes the teeth of the first external spline 511 and the teeth of the second external spline 512) of the first section 51 of the main shaft 50 are clearance fit with each other. That is, the teeth of the external spline are received in the spaces of the internal spline with a gap therebetween, so as to ensure that a relative rotation movement can be made between the internal and external splines. In addition, an axial movement is made by the internal and external splines relative to each other. The dimension in width of the space of the first internal spline 621 may also receive the second external spline 512 in a straight spline form making relative axial movement.

Figure 5:
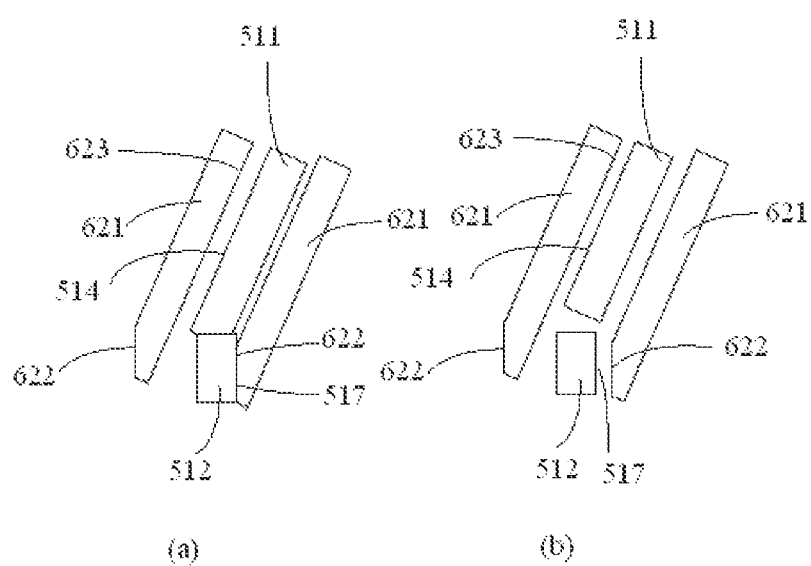
FIG. 5 shows schematic views (a) and (b) of two specific embodiments of the combined splines in the starter of the present invention.

Referring to FIG. 5, a schematic view of the mating between the teeth of combined external splines and the spaces of an internal spline is shown. No matter whether the first external spline 511 and the second external spline 512 are formed integrally or they are arranged separately, in a rotating direction of the main shaft 50, the first external spline 511 and the second external spline 512 are in flush arrangement or in staggered arrangement. When the both are in flush arrangement, the first external spline 511 and the second external spline 512 are synchronous; when they are in staggered arrangement, as shown in Figures, the second external spline 512 is arranged in a lagging position with respect to the first external spline 511. Here, the so-called synchronous mainly means that the first internal spline 621 contacts the first external spline 511 and the second external spline 512 at the same time when the pinion 60 drives the main shaft 50 to rotate. Under this circumstance, the two ends in the width direction of the teeth of the second external spline 512 have to be in the extended lines of the flanks at both sides of the teeth of the first external spline 511. The so-called lagging means that when the main shaft 50 drives the pinion 60 to rotate (a relative rotation between the external and internal splines), the first external spline 511 contacts the first internal spline 621 first (while the second external spline 512 is at a distance from the first interior spline 621); and that when the pinion 60 drives the main shaft 50 to rotate, the first internal spline 621 contacts the second external spline 512 first (while the first internal spline 621 is at a distance from the first external spline 511).

Therefore, according to the mating between the internal and external splines, the teeth of the first external spline 511 includes at least a first active tooth flank 514, and the first internal spline 621 includes at least a second active tooth flank 622. The first internal spline 621 includes at least a first passive tooth flank 623, and the second external spline 512 includes at least a second passive tooth flank 517. The first active tooth flank 514 is located corresponding to the first passive tooth flank 623 of the first internal spline 621, and the second active tooth flank 622 is located corresponding to the flank of the second external spline 512 in a straight spline form. When the second active tooth flank 622 is a chamfer on the first internal spline 621, the surface where the chamfer lies is parallel to the second passive tooth flank 517 of the second external spline 512. In the direction in which the main shaft 50 drives the pinion 60 to rotate together, the first passive tooth flank 623 (i.e., the first interior spline 621) may be driven by the first active tooth flank 514; and in the direction in which the pinion 60 drives the main shaft 50 to rotate together, the second passive tooth flank 517 (i.e., the second external spline 512) may be driven by the second active tooth flank 622. The above description applies to the case where the first external spline 511 is a helical spline and the second external spline 512 is a straight spline. As could be understood by persons skilled in the art, when the first external spline is a straight spline and the second external spline is a helical spline, it also applies as long as the condition that, in the direction where the pinion 60 is an active piece and the main shaft 50 is a passive piece, the first external spline may be driven by the second active tooth flank of the first internal spline is met.

Although the second external spline is a straight spline, persons skilled in the art should understand that, in addition that, the second external spline may also be an oblique spline with its inclined direction opposite to the turning direction of the first external spline, and/or be a helical spline with its turning direction opposite to that of the first external spline. Then, the form of the first internal spline also needs to be adjusted accordingly, that is, as an oblique spline and/or a helical spline.

As could also be understood by persons skilled in the art, apart from the integrally formed internal spline as shown in the present example, the internal spline could be divided into a first internal spline and a second internal spline, which respectively correspond to the first external spline 511 in a form of a helical spline and a second external spline 512 in a form of a straight spline (or an oblique spline and/or a helical spline). Alternatively, the external spline is integrally formed and corresponds to a first internal spline in a form of a helical spline, and a second internal spline in a form of a straight spline (or an oblique spline and/or a helical spline).

The spiral direction of the helical spline depends on the rotating direction of the main shaft 50. Therefore, the spiral direction of the helical spline shown in the Figures is for illustration only by way of example. When the rotating direction of the main shaft 50 reverses, the spiral direction of the helical spline follows to reverse.

Turning back to FIGS. 3-4, a structural schematic view of the main shaft 50 and a pinion 60 after assembling is shown. A circle of ring groove 513 is opened on the first external spline 511, and a snap ring 515 is disposed within the ring groove 513 to prevent the pinion 60 from moving out of the main shaft 50 axially relative to the main shaft 50. The pinion 60 is located at a limit position relative to the main shaft 50 when the pinion 60 touches the snap ring 515. The spring 516 is sleeved on the spring mounting portion 502 with its one end abutting against and within a stepped hole and the other end abutting against an end surface of the middle section 53. The spring is compressed when the pinion 60 is located at the limit position contacting the snap ring 515.

Figure 6:
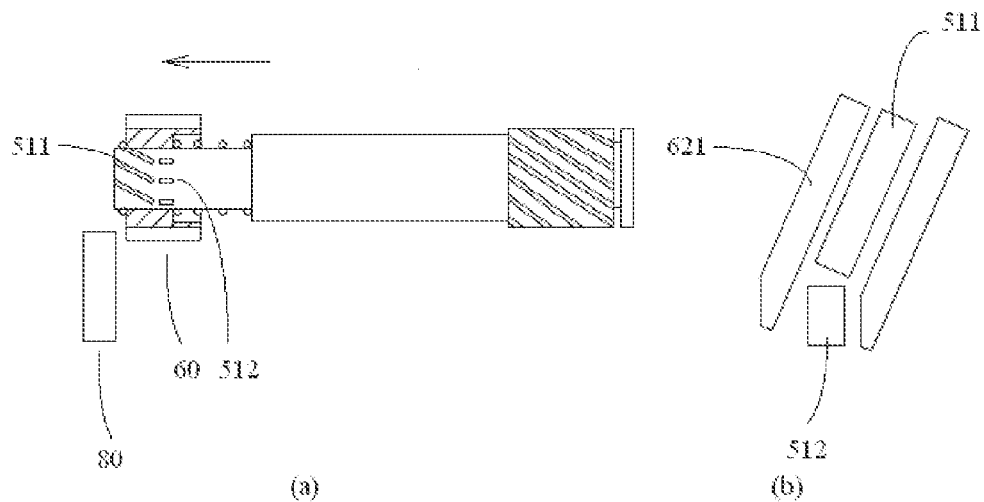
FIGS. 6-9 are schematic views of the engaging process of the starter of the present invention with a flywheel of an engine.
Figure 7:
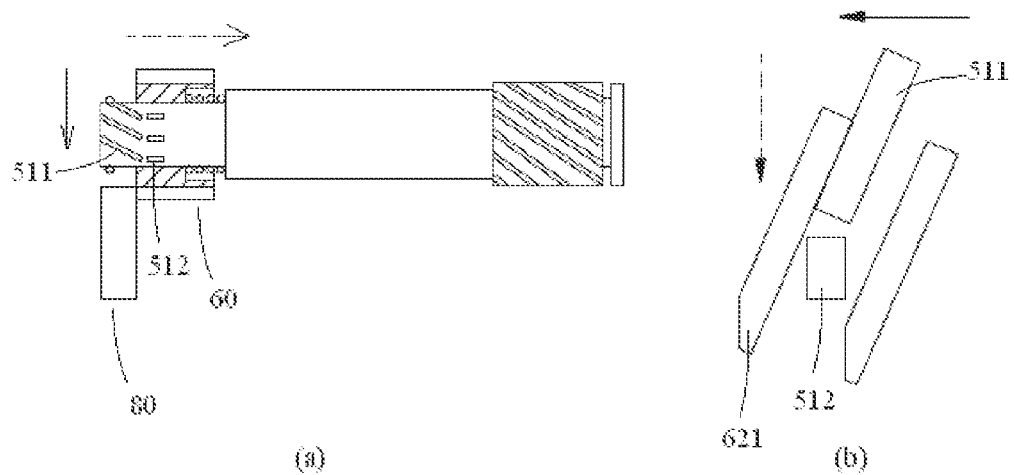

Referring now to the FIGS. 6-9, the engaging process of the pinion 60 of the starter and the flywheel ring gear 80 of the engine is shown. In an initial state, the shift lever 71 is pushed by an action switch of a control section to move the main shaft 50 axially to the left. The electric motor rotates and the torque is transmitted to the main shaft 50 through the planet gear speed reducer 20 and the overrunning clutch 3. At that time, the pinion 60 abuts against the snap ring 515 due to the preload applied by the spring 516. Since the pinion 60 is fixed relative to the first section 51 of the main shaft 50, the pinion 60 is rotated together with the main shaft 50, as shown in FIG. 6.

The pinion 60 will just mesh into the ring gear 80 when the main shaft 50 is moved axially to the left if the teeth of the pinion 60 do not interfere with the teeth of the ring gear 80. As shown in FIG. 7a, however, in the case that the teeth of the pinion 60 happen to interfere with the teeth of the ring gear 80, the end surface of the pinion 60 will run into the end surface of the ring gear 80 without meshing into the ring gear 80. As the main shaft 50 continues to move axially to the left, since the pinion 60 has not yet meshed into the ring gear 80 at this moment, with the block of the ring gear 80, the pinion 60 will make an axial linear movement in the direction indicated by a dotted arrow in FIG. 7a (to the right) with respect to the main shaft 50. The shift lever 71 stops when controlling the main shaft 50 to advance to a predetermined position.

Then, turning to the FIG. 7b, it is an enlarged schematic view of the internal and external splines in FIG. 7a. When the first internal spline 621 (the pinion 60) moves downward relative to the first external spline 511 (the main shaft 50) as indicated by a dotted arrow in the Figure (which equals to the pinion 60 moves to the right with respect to the main shaft 50), the first active tooth flank 514 of the first external spline 511 will soon come into contact with the first passive tooth flank 623 of the first internal spline 621. Through this mutual contact, an acting force is produced between the first active tooth flank 514 of the first external spline 511 and the first passive tooth flank 623 of the first internal spline 621. Due to the function of the helical spline, the acting force applied on the pinion 60 by the first active tooth flank 514 of the first external spline 511 has a circumferential component (in a left direction as shown in FIG. 7b) and an axial component toward the limit position (in a forward direction as shown in FIG. 7b). On one hand, a blocking force applied by the ring gear 80 to the pinion 60 drives the pinion 60 to move axially and linearly away from the limit position relative to the main shaft 50 (in a downward direction as shown in FIG. 7b) against the axial component of the acting force applied to the pinion 60 by the first active tooth flank 514 and a frictional force between the first active tooth flank 514 of the first external spline 511 and the first passive tooth flank 623 of the first internal spline 621. On the other hand, the circumferential component of the acting force applied by the first external spline 511 pushes the first internal spline 621 to make a leftward rotation movement as shown in the Figure. In this way, the pinion 60 is rotated relative to the main shaft 50 and the teeth on the ring gear 80 find the spaces of the pinion 60 quickly and enter into the spaces.

Figure 8:
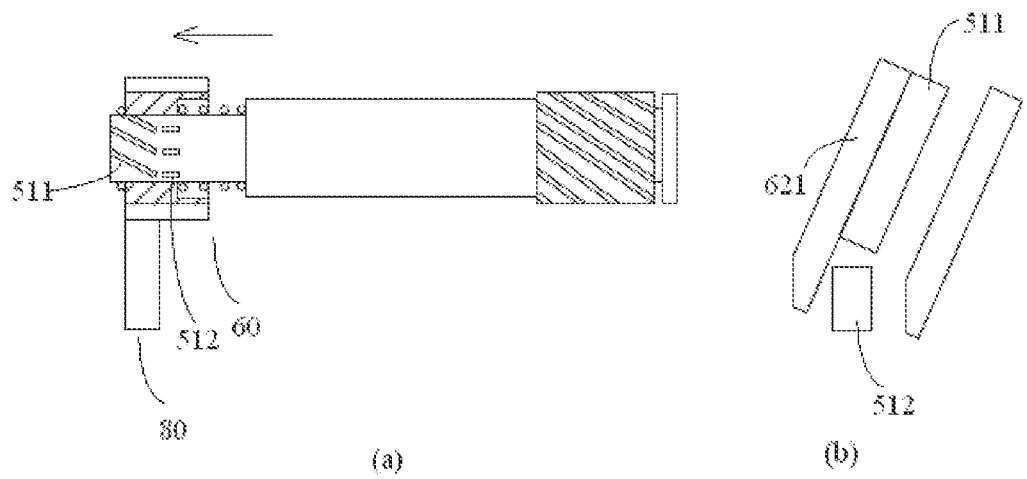

Under the reaction force of the spring 516, the pinion 60 springs back and moves axially toward the direction as shown in FIG. 8 until it touches the snap ring 515. At this moment, the pinion 60 is completely engaged with the ring gear 80.

Once the pinion 60 is meshed into the flywheel ring gear 80, it means that the torque is further transmitted to a crankshaft of the engine by the fly wheel, thereby the engine is started.

Figure 9:
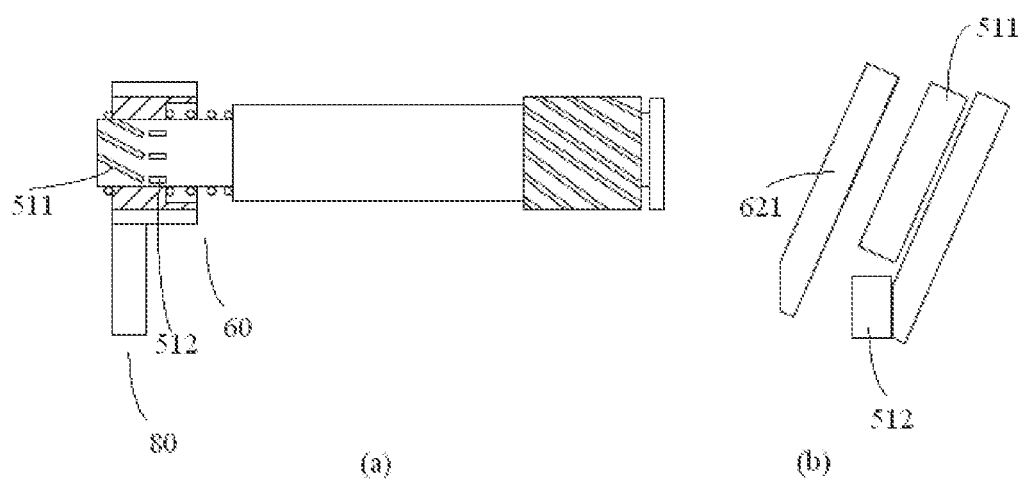

Referring to FIG. 9, after the engine is started and ignited, the ring gear 80 rapidly speeds up, overruns the pinion 60 and then reversely transmits the overrunning torque to the main shaft 50. In the overrunning state, the second active tooth flank 622 of the first internal spline 621 contacts the second passive tooth flank 517 of the second external spline 512. Through this contact, a mutual acting force is produced between the second active tooth flank 622 of the first internal spline 621 and the second passive tooth flank 517 of the second external spline 512. In one specific embodiment according to the present invention, both the second active tooth flank 622 of the first internal spline 621 and the second passive tooth flank 517 of the second external spline 512 are axially extending surfaces, therefore, there is only circumferential acting force and no axial acting force therebetween.

In another specification embodiment according to the present invention, the second active tooth flank 622 of the first internal spline 621 and the second passive tooth flank 517 of the second external spline 512 may also be surfaces extending in an opposite spiral direction to that of the first active tooth flank 514 and the first passive tooth flank 623. That is, if the first active tooth flank 514 and the first passive tooth flank 623 are left spirals in spiral direction, the second active tooth flank 622 and the second passive tooth flank 517 are right spirals, and vice versa. In this case, the acting force applied to the pinion 60 by the second passive tooth flank 517 of the second external spline 512 has a circumferential component and an axial component toward the limit position, but has no axial component away from the limit position, thereby an axial return movement (toward the right direction of FIG. 9a) by the pinion 60 can be avoided. By that time, the power transmission between the crankshaft of the engine and the electric motor is immediately cut off by the overrunning clutch 3, preventing the electric motor from being damaged due to reverse dragging by the engine operating with high speed.

The above embodiment is merely intended to illustrate but not limit the present invention, and various changes and modifications may be made by persons skilled in the art without departing the scope of the present invention. Therefore, all the equivalent technical solutions belong to the scope of the present invention, which should be defined by the appended claims.

What is claimed is:

1. An engaging device for a starter, comprising
a main shaft (50) including an external spline provided on the main shaft (50), wherein the external spline has teeth having an active tooth flank (514) and a passive tooth flank (517), wherein the active tooth flank (514) of the external spline extends in a helical form in a first direction, and wherein the passive tooth flank (517) of the external spline extends only axially and not helically relative to the main shaft (50); and
a pinion (60) sleeved on the main shaft (50), wherein the pinion (60) includes an internal spline that mates with the external spline of the main shaft (50), wherein the internal spline has teeth having an active tooth flank (622) and a passive tooth flank (623), wherein the passive tooth flank (623) of the internal spline extends in a helical form in the first direction, and wherein the active tooth flank (622) of the internal spline extends only axially and not helically relative to the main shaft (50).

2. The engaging device according to claim 1,
wherein the active tooth flank (514) of the external spline applies a first acting force on the pinion (60) when the active tooth flank (514) of the external spline is in contact with the passive tooth flank (623) of the internal spline and when the main shaft (50) is rotating,
wherein the first acting force has a circumferential component and an axial component directed toward the limit position,
wherein the passive tooth flank (517) of the external spline applies a second acting force on the pinion (60) when the active tooth flank (622) of the internal spline is in contact with the passive tooth flank (517) of the external spline and when the main shaft (50) is rotating, and
wherein the second acting force has no axial component directed away from the limit position.

3. The engaging device according to claim 1, characterized in that, the external spline of the main shaft (50) and the internal spline of the pinion (60) form a clearance fit therebetween, an elastically predeformed elastic element (516) is mounted between the main shaft (50) and the pinion (60), the predeformed elastic element (516) applies an elastic force in a direction toward a limit position of the pinion (60) on the main shaft (50).

4. The engaging device according to claim 1, characterized in that, the external spline of the main shaft (50) comprises a first external spline (511) and a second external spline (512), the active tooth flank (514) of the external spline is provided on the first external spline (511), and the passive tooth flank (517) of the external spline is provided on the second external spline (512); and
the internal spline of the pinion (60) comprises a first internal spline (621), the first internal spline (621) is a helical spline, the active tooth flank (622) of the internal spline is provided on the teeth of the first internal spline (621) located corresponding to the second external spline (512).

5. The engaging device according to claim 4, characterized in that, the active tooth flank (622) of the internal spline is a chamfer on the first internal spline (621), a surface where the chamfer lies is parallel to a surface of the passive tooth flank (517) of the second external spline (512).

6. The engaging device according to claim 4, characterized in that, the first external spline (511) and the second external spline (512) are arranged separately.

7. The engaging device according to claim 4, characterized in that,
a clearance exists between the second external spline (512) and the first internal spline (621) when the active tooth flank (514) of the external spline contacts the tooth flank of the first internal spline (621); and
a clearance exists between the first internal spline (621) and the first external spline (511) when the active tooth flank (622) of the internal spline contacts the second external spline (512).

8. The engaging device according to claim 4, characterized in that, the first external spline (511) and the second external spline (512) are made integrally.

9. The engaging device according to claim 1, characterized in that, the main shaft (50) has a snap ring (515)

mounted thereon, which snap ring (515) abuts the pinion (60) to define a limit position of the pinion (60).

10. The engaging device according to claim 9, characterized in that, the snap ring (515) is mounted on the external spline of the main shaft (50).

11. A starter, comprising,
an electric motor;
a speed reducer connected with the electric motor;
an overrunning clutch comprising a driving piece connected with the speed reducer and a driven piece; and
an engaging device according to claim 1, the main shaft of the engaging device being connected with the driven piece of the overrunning clutch.

12. The starter according to claim 11, characterized in that, the external spline of the main shaft (50) and the internal spline of the pinion (60) form a clearance fit therebetween, an elastically predeformed elastic element (516) is mounted between the main shaft (50) and the pinion (60), the predeformed elastic element (516) applies an elastic force in a direction toward a limit position of the pinion (60) on the main shaft (50).

13. The starter according to claim 11, characterized in that, the external spline of the main shaft (50) comprises a first external spline (511) and a second external spline (512), the active tooth flank (514) of the external spline is provided on the first external spline (511), and the passive tooth flank (517) of the external spline is provided on the second external spline (512); and
the internal spline of the pinion (60) comprises a first internal spline (621), the first internal spline (621) is a helical spline, the active tooth flank (622) of the internal spline is provided on the teeth of the first internal spline (621) located corresponding to the second external spline (512).

14. The starter according to claim 13, characterized in that, the active tooth flank (622) of the internal spline is a chamfer on the first internal spline (621), a surface where the chamfer lies is parallel to a surface of the passive tooth flank (517) of the second external spline (512).

15. The starter according to claim 13, characterized in that, the first external spline (511) and the second external spline (512) are arranged separately.

16. The starter according to claim 13, characterized in that, a clearance exists between the second external spline (512) and the first internal spline (621) when the active tooth flank (514) of the external spline contacts the tooth flank of the first internal spline (621); and
a clearance exists between the first internal spline (621) and the first external spline (511) when the active tooth flank (622) of the internal spline contacts the second external spline (512).

17. The starter according to claim 13, characterized in that, the first external spline (511) and the second external spline (512) are made integrally.

18. The starter according to claim 11, characterized in that, the main shaft (50) has a snap ring (515) mounted thereon, which snap ring (515) abuts the pinion (60) to define a limit position of the pinion (60).

19. The starter according to claim 18, characterized in that, the snap ring (515) is mounted on the external spline of the main shaft (50).

* * * * *